(12) United States Patent
Lesar

(10) Patent No.: US 7,896,730 B2
(45) Date of Patent: Mar. 1, 2011

(54) VARIABLE LENGTH, VARIABLE DIAMETER SEPARATION CHAMBER FOR A FOOD PROCESSOR HAVING CONFIGURABLE CUTTING PERFORATIONS

(75) Inventor: Nick J. Lesar, Palmyra, WI (US)

(73) Assignee: Weiler and Company, Inc., Whitewater, WI (US)

( * ) Notice: Subject to any disclaimer, the term of this patent is extended or adjusted under 35 U.S.C. 154(b) by 809 days.

(21) Appl. No.: 11/681,559

(22) Filed: Mar. 2, 2007

(65) Prior Publication Data
US 2007/0254577 A1 Nov. 1, 2007

Related U.S. Application Data

(60) Provisional application No. 60/778,281, filed on Mar. 2, 2006.

(51) Int. Cl.
*A22C 17/00* (2006.01)

(52) U.S. Cl. ..................................... 452/138

(58) Field of Classification Search .................. 452/135, 452/138; 241/24, 74, 82.1–82.3, 86, 89.2, 241/823, 247, 260.1
See application file for complete search history.

(56) References Cited

U.S. PATENT DOCUMENTS

| 4,077,089 | A |   | 3/1978  | Dutaud |
|-----------|---|---|---------|--------|
| 4,340,184 | A |   | 7/1982  | Poss |
| 4,575,899 | A |   | 3/1986  | Prosenbauer |
| 4,824,027 | A |   | 4/1989  | Shaw et al. |
| 5,067,926 | A | * | 11/1991 | Richburg ..................... 452/135 |
| 5,302,149 | A | * | 4/1994  | Witham et al. .............. 452/135 |
| 5,306,202 | A |   | 4/1994  | Meeker |
| 5,383,809 | A |   | 1/1995  | Paoli |
| 5,580,305 | A | * | 12/1996 | McFarland .................. 452/138 |
| 5,607,062 | A |   | 3/1997  | Poser et al. |
| 5,813,909 | A | * | 9/1998  | Goldston ..................... 452/138 |

* cited by examiner

*Primary Examiner*—Thomas Price
(74) *Attorney, Agent, or Firm*—Boyle Fredrickson, S.C.

(57) ABSTRACT

A separation chamber particularly suited for meat processing is configurable to have various feed and discharge end diameters and/or chamber length. The separation chamber may also have configurable cutting perforations.

19 Claims, 10 Drawing Sheets

VARIABLE LENGTH, VARIABLE DIAMETER SEPARATION CHAMBER FOR A FOOD PROCESSOR HAVING CONFIGURABLE CUTTING PERFORATIONS

CROSS-REFERENCE TO RELATED APPLICATION

This application claims the benefit of U.S. provisional application Ser. No. 60/778,281, entitled Open Slot Segmented Separation Chamber for a Food Processor and filed Mar. 2, 2006, assigned to the assignee of this application, the disclosure of which is incorporated herein.

BACKGROUND OF THE INVENTION

This disclosure relates generally to meat processing equipment for deboning or otherwise separating meat, such as beef, poultry, fish, and pork from bone, cartilage, or sinew. More particularly, the disclosure is directed to a meat processor having a slotted and segmented separation chamber.

Meat processing machines typically have a generally cylindrical and perforated separation chamber to separate meat. In operation, bone-in meat is placed or fed into the interior volume of the separation chamber. An auger or similar device then forcibly drives the meat from the feed end of the separation chamber to the bone discharge end. As the meat is forced through the separation chamber, meat is stripped from the bone and passed through the perforations and into a meat collector, whereupon the meat is customarily used as filler and for the making of lunchmeat, meat patties, canned meat, and sausage. Recently, separation chambers have been designed for removing meat from a bone, but doing so in a manner that allows the meat to be used as a primary meat source rather than simply as filler.

U.S. Pat. No. 4,077,089 to Dutaud discloses a separation chamber for a meat deboning machine that is formed of a number of plate members that each includes an arrangement of teeth and recesses on both sides of the plate. The plates are assembled about a screw shaft in a nested arrangement in which the teeth of one plate rest substantially within the grooves of an adjacent plate. The plates are spaced from one another by a number of spacers placed between adjacent plates, which provide an opening between the teeth and grooves of adjacent plates when assembled, and through which meat is forced by the screw shaft. The plates and spacers are held in the nested arrangement by a nut and bolt arrangement inserted through the plates.

U.S. Pat. No. 4,340,184 to Poss discloses an apparatus for mechanical separation of a combination of meat and bone into useful fractions. The apparatus includes a separator screen surrounding a feed screw. The separation screen consists of an alternating arrangement of plain discs and annular discs. The discs are clamped tightly in a face-to-face arrangement by tie rods and placed within an arrangement of circumferentially spaced longitudinal bars that rest within rectangular slots in the respective discs. Each face in the configured discs is cut away to provide an opening between adjacent pairs of discs. The configured discs also contain a slotted annular ring along the interior edge of the disc. The inner ring defines slots oriented at an angle of about 150 degrees to the radius of the ring. In operation, the screw forces the meat against blunt edges of the slots to remove the meat from bones and to provide movement of the meat through the slots and openings between the discs for collection.

U.S. Pat. No. 4,575,899 to Prosenbauer describes a meat separator for separating meat from a meat and bone mass by the action of a press piston pressing against a counter-piston within a press cavity. The cavity is defined by a pair of perforated filters placed in abutting relationship within the cavity. Each filter comprises a thin-walled mantle terminating in a connecting flange at one end. The flange properly positions each filter within the cavity by engaging a stationary wall on either side of the cavity. The mantles of each filter consist of circumferential ribs spaced about the length of the mantle. In between each rib, passage openings are equally spaced about the circumference of the filter. When the meat and bone mass is compressed within the filters by the pistons, the meat is forced outward through the passage opening for collection by a collecting cylinder disposed about the filters.

U.S. Pat. No. 5,067,926 to Richburg discloses a cylindrical sieve for a meat deboning machine. The sieve includes stacked sieve rings that form the body of the sieve. Each ring includes major lands and minor lands circumferentially spaced about one surface of the ring that form grooves between adjacent lands. The major lands include openings through which elongated elements are inserted. The elongated elements comprise an alignment means for stacking the rings in an abutting relationship to form the sieve in which all the lands in each ring face the same direction. The elongated elements are received within a pair of end caps disposed at each end of the sieve to secure the sieve within the deboning machine. Each of the lands includes a bonding agent placed on the abutting surface of the land that fills any voids in the lands to avoid accumulation of meat or bacteria within the voids, and bonds adjacent rings to one another. When stacked and bonded to form the sieve, the grooves between adjacent lands form slots through which the meat removed from the bone is forced.

U.S. Pat. No. 5,383,809 to Paoli describes a desinewing machine for producing coarse-textured meat. The machine has a housing which encloses a rotor used to strip sinew from incoming meat. The rotor is generally cylindrical in shape and has several cutting elements defined about its exterior surface by a spiraling helical groove. At the entrance to the rotor, the helical groove forms cutting elements which have a much larger cutting surface than cutting elements located further downstream along the rotor. Holes are located in a circumferentially spaced arrangement about the entire length of the rotor, wherein the arrangement includes an equally spaced ring of holes between each pair of adjacent cutting surfaces. In operation, meat and sinew dropped into the machine contacts the cutting surfaces of the exterior of the rotor. The cutting surfaces interact with a pressure bar that has a plurality of cutting surfaces spaced on a panel concentrically shaped to the exterior of the rotor to remove the sinew from the meat. The meat then passes through the openings in the rotor into the interior of the rotor. While the sinew is pushed downstream by the action of the cutting surfaces of the rotor on the sinew, the meat located inside the rotor is urged upstream towards a number of holes disposed in a disc forming the upstream end of the rotor. The meat is urged in this direction by the counter rotation of a frustoconical sleeve disposed within the rotor.

U.S. Pat. No. 5,813,909 to Goldston describes a slotted separation chamber for a compression-type deboning machine. The slotted separation chamber is constructed to have a plurality of elongated slots each formed of a pair of spaced apart side walls presenting interior side edges, and formed of opposing arcuate end walls presenting interior arcuate end edges. The slots are oriented such that side edges lie at an angle relative to the central axis of the separation chamber so as to be tilted in the direction of rotation of a cooperating auger. The side and end edges cooperate with the fluted turns of the auger to shave or peel away the meat from the bone to produce a coarser and highly textured separated product.

Notwithstanding these and other advancements made in the art, there remains a need for separation chambers that are configurable to have variably sized feed and discharge ends. Additionally, there remains a need for separation chambers with variable lengths. Moreover, there is a need in the art for separation chambers that allow variability in the arrangement of the meat cutting slots or perforations.

BRIEF DESCRIPTION OF THE INVENTION

The present disclosure is directed to a separation chamber that is particularly suitable for separating meat from a meat and bone mass. The separation chamber is designed to be effective in reducing the accumulation of hard materials on its inside surface using a slot or perforation arrangement that provides for the unassisted escape of softer materials but traps harder materials in such a manner that requires mechanical intervention for their removal. The separation chamber may also be formed of multiple radial segments that collectively define a segmented chamber. This provides flexibility in not only the overall length of the separation chamber, but when radially tapered segments are used, variations in the diameter of the feed and discharge ends can be realized. In one embodiment, the radial segments can be aligned and stacked to provide a desired configuration of the slot arrangement, including variations in slot dimensions and the relative position of the slots.

Therefore, in accordance with one aspect, the present disclosure includes a separation chamber for separating soft material from a hard material carrier to which the soft material is attached. The separation chamber has an interior volume sized for receiving and passing a mass, and further includes a first chamber member defining a first feed end, and a first discharge end, wherein a first portion of the interior volume is defined between the first feed end and the first discharge end. A second chamber member is removably connected to the first chamber member, and defines a second feed end, and a second discharge end, wherein a second portion of the interior volume is defined between the second feed end and the second discharge end.

In accordance with another aspect of the present disclosure, a separation chamber for separating soft material from a hard material carrier to which the soft material is attached is disclosed. The separation chamber has a separation chamber body and a plurality of perforations formed therein. At least a portion of the plurality of perforations are closed at a first end and open at a second end that is opposite the first end.

According to another aspect of the present disclosure, a separation chamber for a meat processing machine is presented. The separation chamber has an upstream chamber section and a downstream chamber section connected to the upstream chamber section. Each chamber section includes a side wall having slots formed therein which establish communication between an internal passage defined by the chamber sections and an exterior of the separation chamber formed by the connected chamber sections.

In accordance with yet another aspect of the disclosure, a separation chamber has an outer wall arrangement, a series of peripheral grooves formed in an inner surface defined by the outer wall arrangement, and slots formed in the outer wall arrangement, wherein each slot opens onto and extends from one of the peripheral grooves in the inner surface of the outer wall arrangement and opens onto an exterior surface defined by the outer wall arrangement.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

A separation chamber adapted for use in a processor for separating meat from hard material such as sinew or bone will be described. An exemplary processor is illustrated in U.S. Pat. No. 5,813,909, the disclosure of which is incorporated by reference. Typically, the processor includes an auger or screw-like member which extends through a separation chamber to advance material under force through the separation chamber, which may be any type of food material having a generally soft component adapted to be separated from a generally hard component. While a separation chamber will be described in the context of food processing, and in particular meat processing, the separation chamber may be applicable for other processing devices where it is desired to remove relatively soft material from relatively hard material.

Figure 1A:
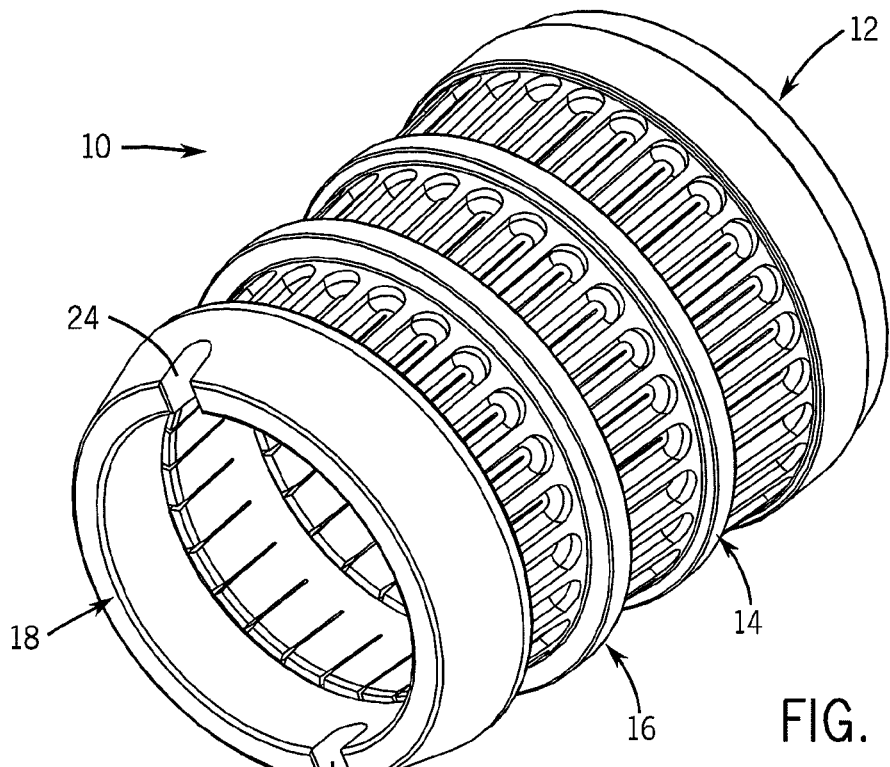
FIG. 1A is a perspective view of a segmented separation chamber having multiple stages assembled according to one embodiment of the present disclosure.
Figure 1B:
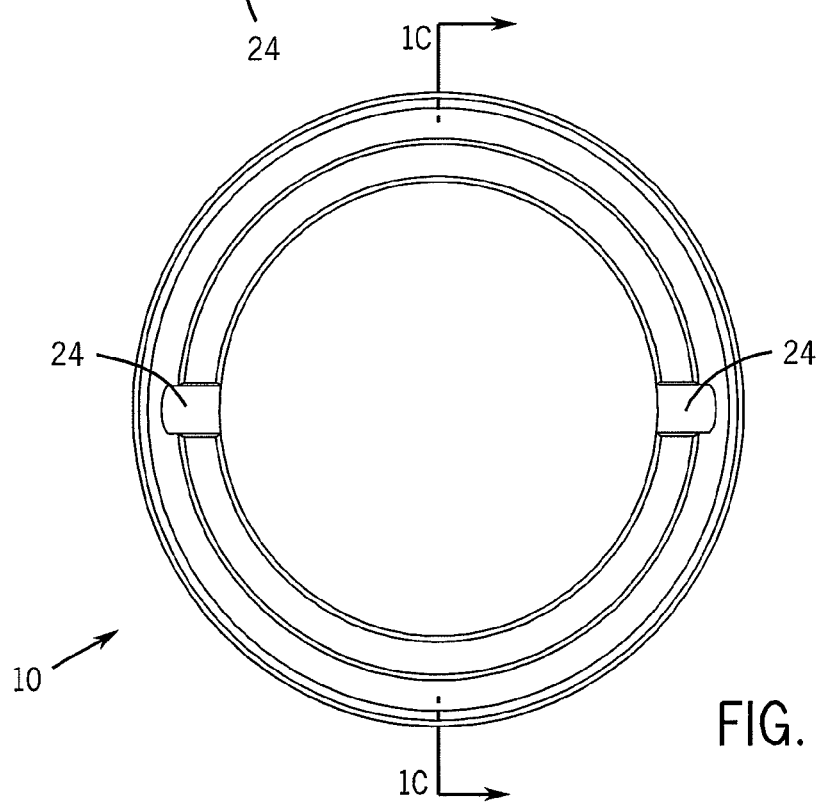
FIG. 1B is a feed end view of the separation chamber.
Figure 1C:
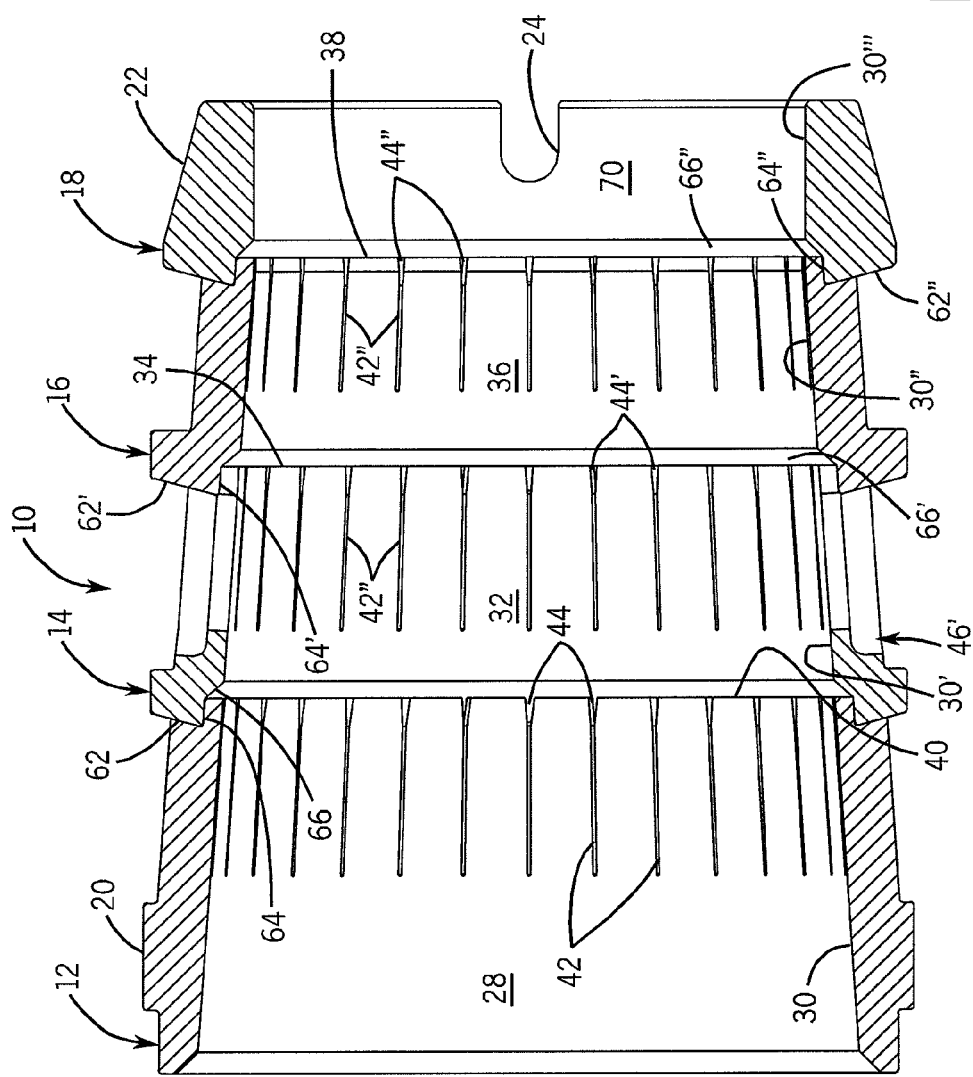
FIG. 1C is a cross-sectional view of the separation chamber taken along lines C-C of FIG. 1B.

Referring now to FIGS. 1A-1C, a separation chamber 10 according to one embodiment of the present disclosure is shown. Separation chamber 10 is formed of a number of sections 12, 14, 16, and 18 which are fitted together and which cooperate to define the overall structure and length of separation chamber 10. In the illustrated embodiment, separation chamber 10 is formed of a first stage or upstream section 12, a second stage or intermediate section 14, and a third stage or downstream section 16. A nose section 18 is located at the downstream end of downstream section 16. Upstream section 12 and nose section 18 include external structure, such as a ring 20 and a tapered outside surface 22, which are adapted to cooperate with the inlet and discharge areas, respectively, of the separator to enable chamber 10 to be mounted to the separator (not shown). In this regard, nose section 18 includes a pair of diametrically aligned slots 24, each of which is adapted to receive an anti-rotation bar or key 26 of the separator, which is also engaged with an adjacent slot in the separator for ensuring that chamber 10 does not rotate relative to the separator during operation.

Referring now to FIG. 1B, each of sections 12-18 of chamber 10 defines an open upstream or inlet end and an open downstream or discharge end, such that separation chamber 10 defines an open internal passage. Upstream section 12 has a passage 28 which extends between its upstream and downstream ends, and which is defined by a tapered inner wall 30. Similarly, intermediate section 14 has a passage 32 that extends between its upstream and downstream ends, and which is defined by a tapered inner wall 30', and downstream section 16 has a passage 36 that extends between its upstream and downstream ends and is defined by a tapered inner wall 30". Nose section similarly defines a passage 70 between its upstream and downstream ends that is defined by tapered inner walls 30"'. In the illustrated embodiment, inner walls 30, 30",30", and 30"' define a continuous decreasing taper in an upstream-to-downstream direction, to define a tapered internal passage configured similarly to the tapered inner passage of prior art one-piece separation chambers.

While the drawings illustrate a tapered wall construction of separation chamber 10, it is also understood that a similar segmented construction may be provided for a parallel wall separation chamber. In this type of construction, the passages defined by the sections have a constant diameter between the inlet and outlet of each section, which is also matched by the diameter of the nose section, to provide an unrestricted passage that extends between the upstream and downstream ends of the separation chamber.

Still referring to FIG. 1B and with further reference to FIGS. 2A-2E, passage 28 of upstream section 12 terminates in a downstream end edge 40 which is nested within the upstream end of intermediate section 14 in a manner to be explained. A series of slots 42 are formed in inner wall 30 of upstream section 12. Slots 42 are generally parallel to each other and are equally radially spaced about the periphery of inner wall 30. Each slot 42 includes a divergent inlet or entrance portion 44 that opens onto end edge 40. At the location of each slot 42, upstream section 12 includes an axial groove 46 which extends partially through the material of side wall 30. Each groove 46 is formed to define a bottom wall 48, an end wall 50 and a pair of parallel side walls 52. Each groove 46 is open at its downstream end, and a rib 54 is located between each adjacent pair of grooves 46. Ribs 54 are formed of the material of side wall 30 which remains after grooves 46 are formed in side wall 30. The majority of the length of each slot 42 opens onto groove bottom wall 48, to establish communication between passage 28 and the exterior of upstream section 12.

Each rib 54 terminates in an inwardly angled downstream edge 56, which terminates at its inner end at the outer surface of a downstream extension tab 58. The facing edges of each adjacent pair of downstream extension tabs 58 function to form divergent entrance portion 44 of the slot 42 located therebetween. Downstream extension tabs 58 are configured to form a reduced diameter segmented engagement ring at the downstream end of upstream section 12.

Figure 2A:
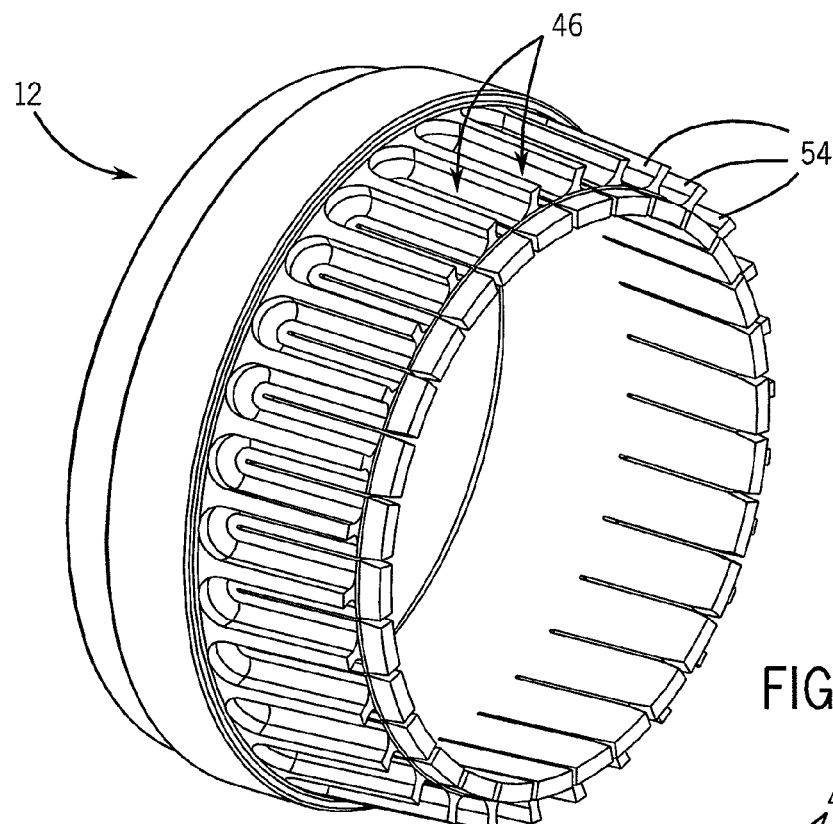
FIG. 2A is a perspective view of a first stage of the separation chamber.
Figure 2B:
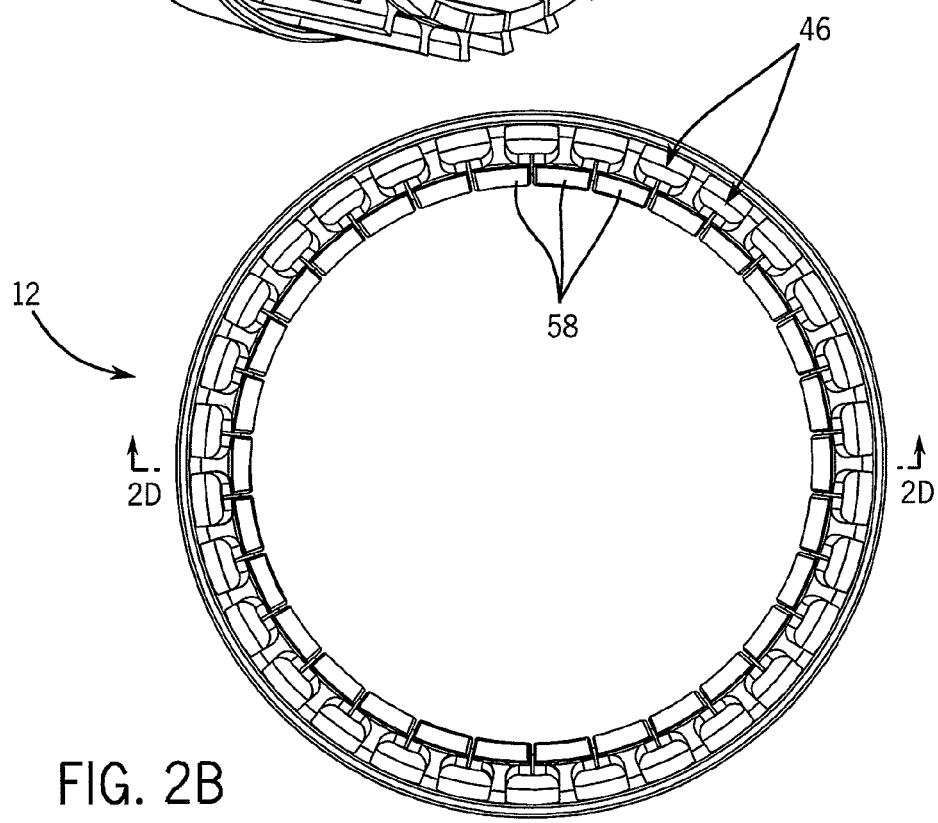
FIG. 2B is a discharge end view of the first stage.
Figure 2C:
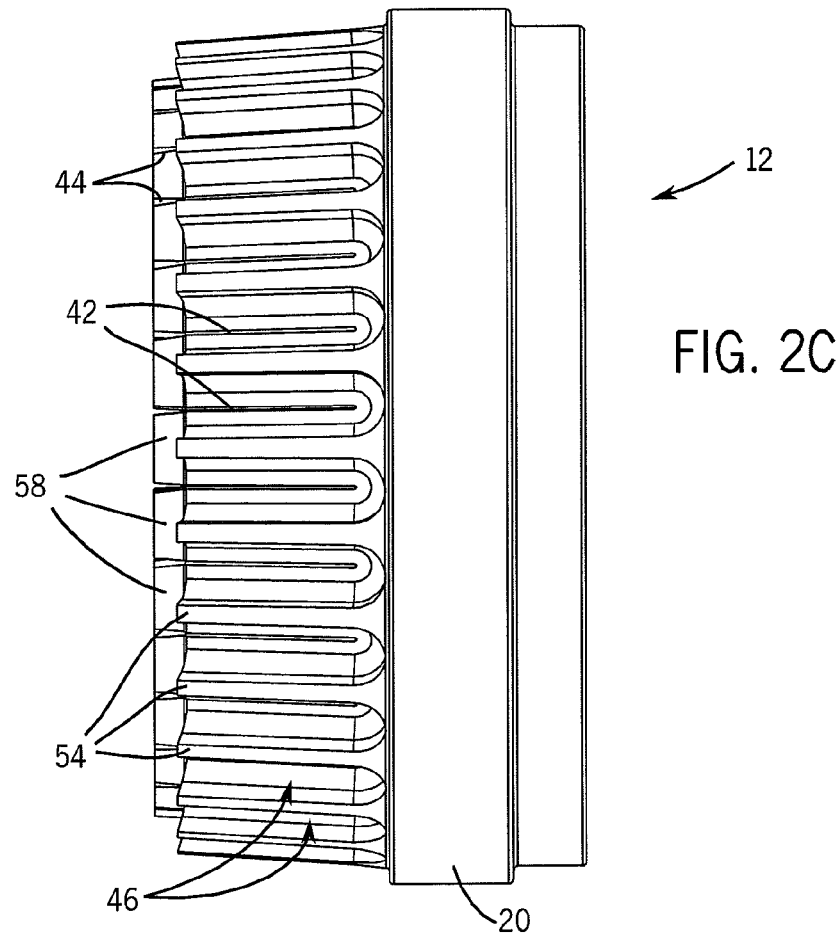
FIG. 2C is a side elevation view of the first stage.
Figure 2D:
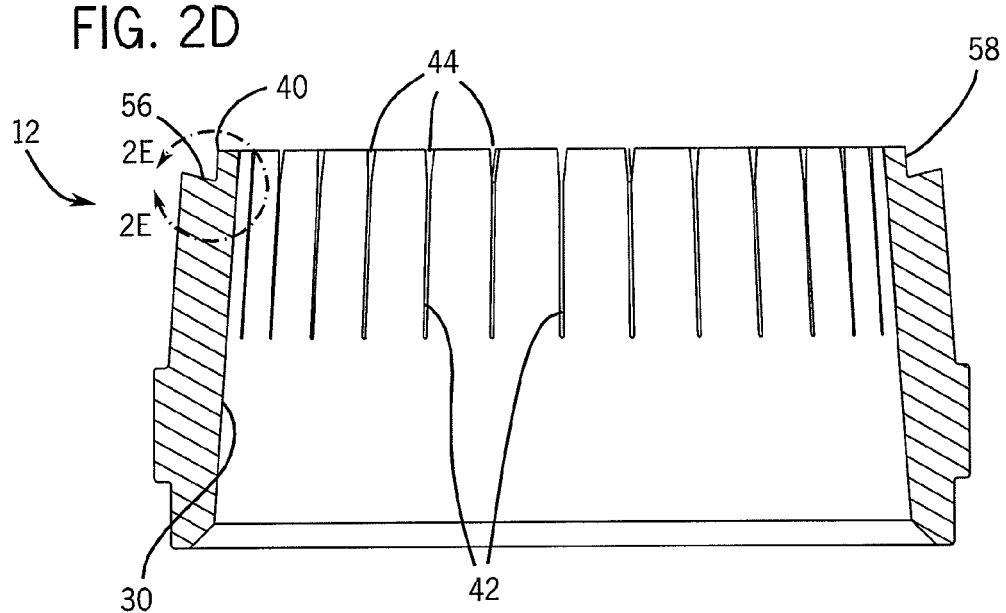
FIG. 2D is a cross-sectional view of the first stage.
Figure 2E:
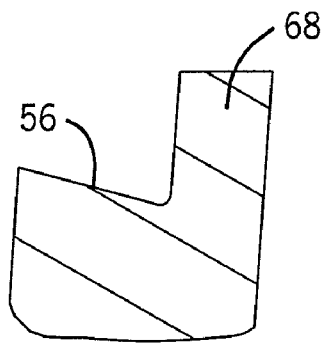
FIG. 2E is an enlarged cross-sectional view of a downstream portion of the first stage.
Figure 2F:
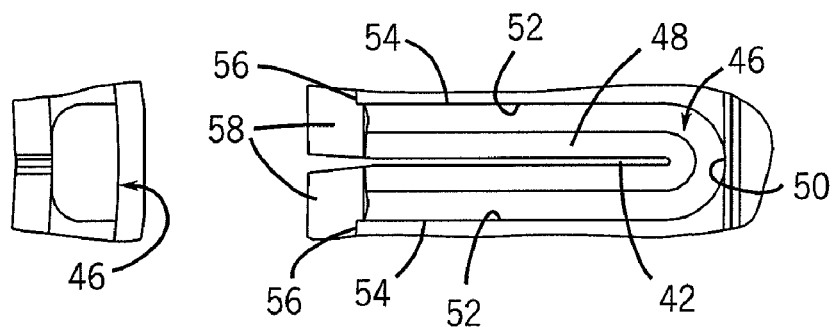
FIG. 2F is a plan view of a slot that forms part of the first stage.

As shown in FIG. 2F, each groove 46 is formed such that its end wall 50 has a rounded configuration. Further, an arcuate transition area is located between the bottom wall 48 and the associated groove side walls 52.

As described with respect to FIGS. 1A-1C, separation chamber 10 is formed by the assemblage of multiple sections or stages. In the illustrated embodiments, each of the sections is tapered so that a tapered passage is formed through the separation chamber 10. In this regard, the diameter of the upstream end (feed end) of a given section is wider than the downstream end (discharge end) of that given section. However, it is contemplated that the separation chamber 10 may be constructed to have a tapered section connected to one or more un-tapered sections or inversely tapered sections.

Referring to FIGS. 3A-3F, an exemplary intermediate section 14 of the separation chamber is shown. As will be described, the intermediate section is similar in construction to the upstream section 12. More particularly, at its downstream end, intermediate section 14 includes the same structure as the downstream portion of upstream section 12, although having overall lesser dimensions due to the tapered construction thereof. For convenient reference, primed reference characters will be used to refer to the analogous structure of intermediate section 14.

Intermediate section 14 has radially spaced slots 42' that are formed along the inner wall 30' thereof. The slots 42' are generally parallel to one another and equally radially spaced about the inner wall 30'. Each slot 42' includes a divergent inlet or entrance portion 44' that opens onto end edge 34. At the location of each slot 42', intermediate section 14 includes an axial groove 46' which extends partially through the material of side wall 30'. Each groove 46' is formed to define a bottom wall 48', an end wall 50' and a pair of parallel side walls 52'. Each groove 46' is open at its downstream end, and a rib 54' is located between each adjacent pair of grooves 46'. Ribs 54' are formed of the material of side wall 30' which remains after grooves 46' are formed inside wall 30'. The majority of the length of each slot 42' opens onto groove bottom wall 48', to establish communication between passage 32 and the exterior of intermediate section 14. Each rib 54' terminates in an inwardly angled downstream edge 56', which terminates at its inner end at the outer surface of a downstream extension tab 58'. The facing edges of each adjacent pair of downstream extension tabs 58' function to form divergent entrance portion 44' of the slot 42' located therebetween. Downstream extension tabs 58' are configured to form a reduced diameter segmented engagement ring at the downstream end of intermediate section 14.

Figure 3A:
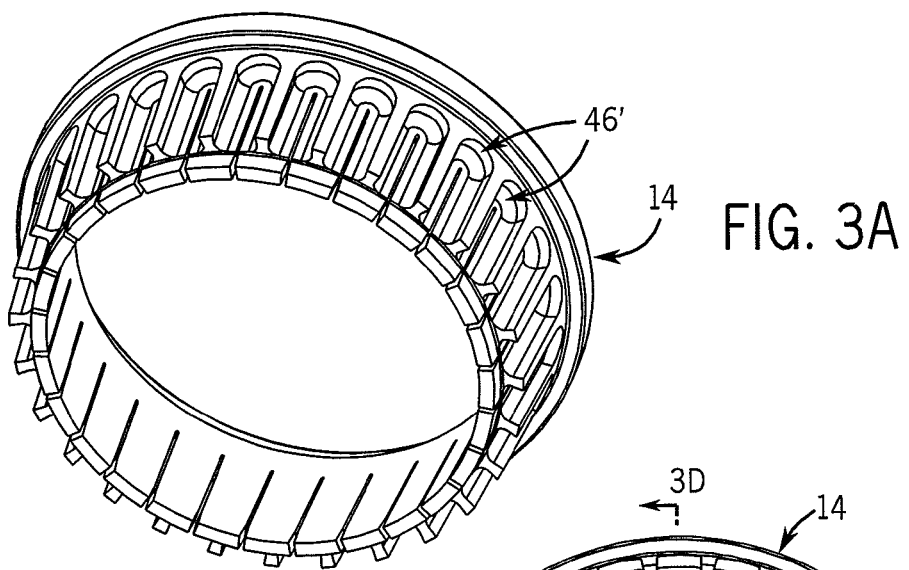
FIG. 3A is a perspective view of a second stage of the separation chamber.
Figure 3B:
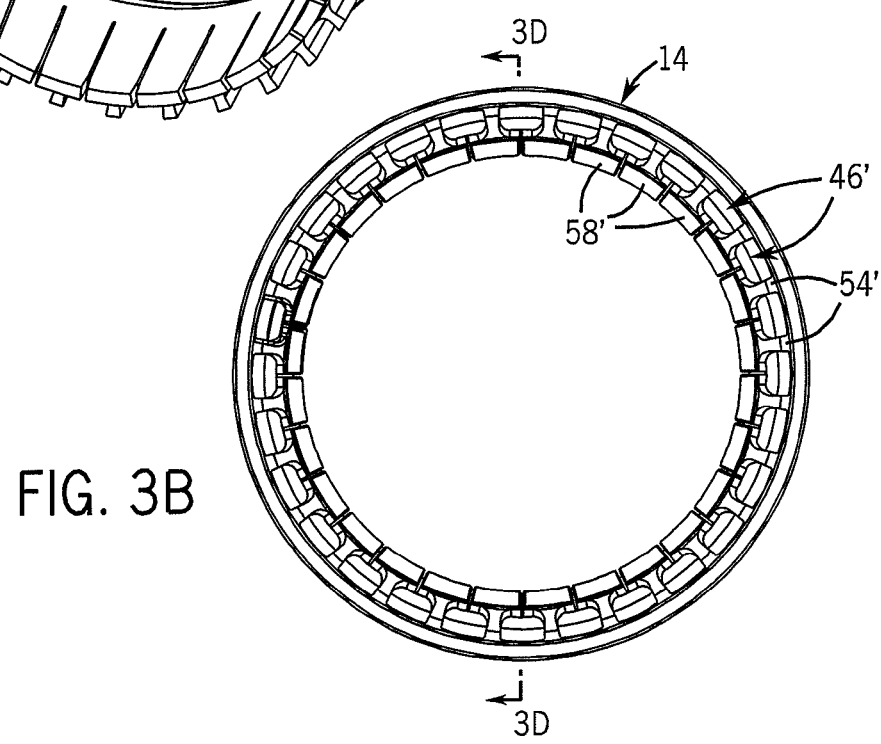
FIG. 3B is a discharge end view of the second stage.
Figure 3C:
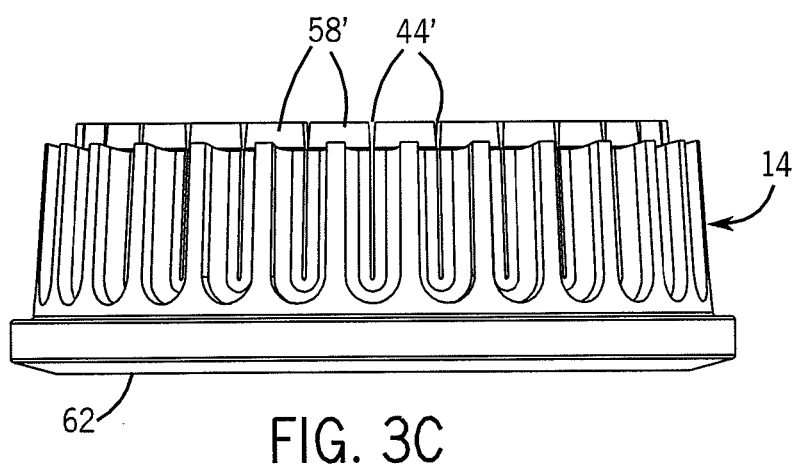
FIG. 3C is a side elevation view of the second stage.
Figure 3D:
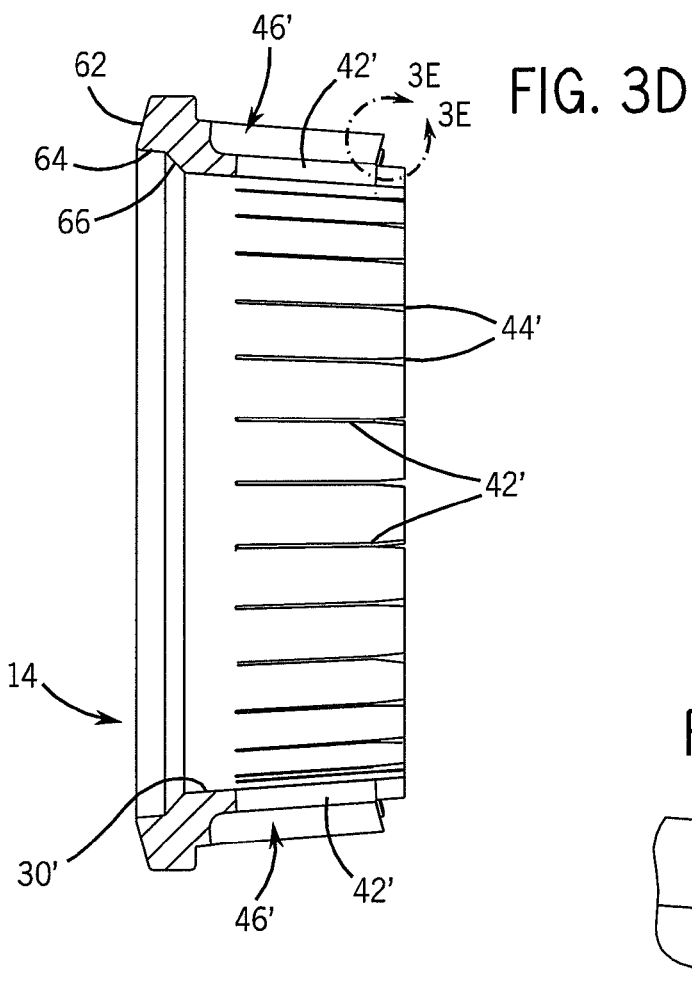
FIG. 3D is a cross-sectional view of the second stage.
Figure 3E:
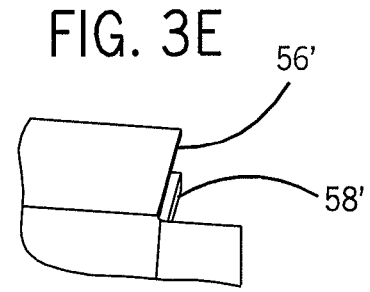
FIG. 3E is an enlarged cross-sectional view of a downstream portion of the second stage.
Figure 3F:
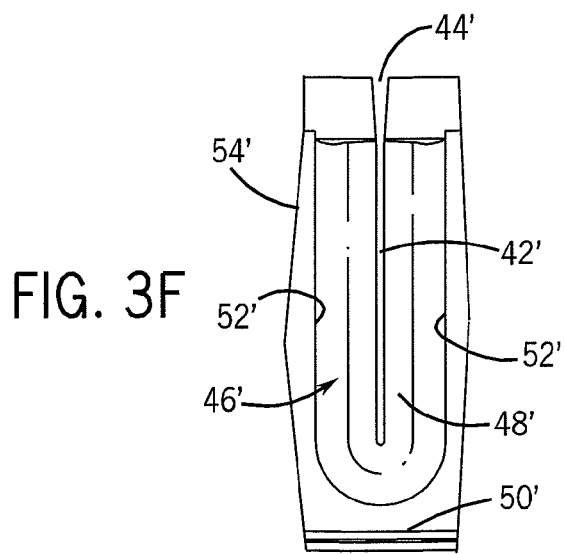
FIG. 3F is a plan view of a slot that forms part of the second stage.
Figure 4A:
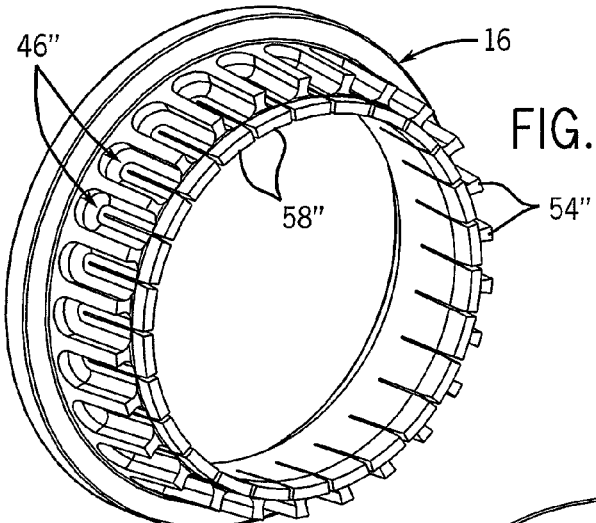
FIG. 4A is a perspective view of a third stage of the separation chamber.
Figure 4B:
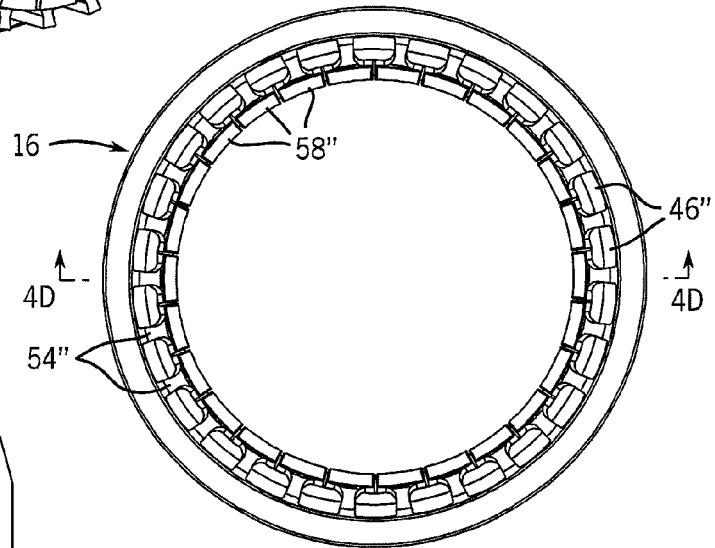
FIG. 4B is a discharge end view of the third stage.
Figure 4C:
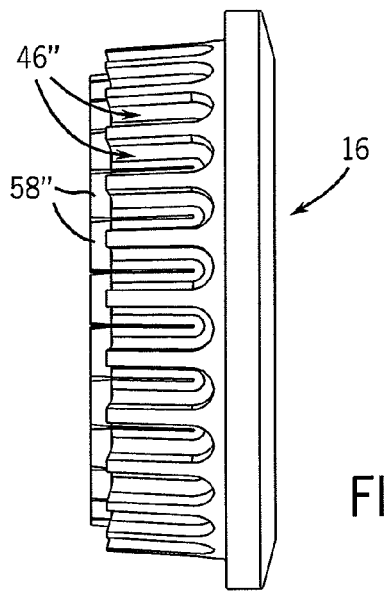
FIG. 4C is a side elevation view of the third stage.
Figure 4D:
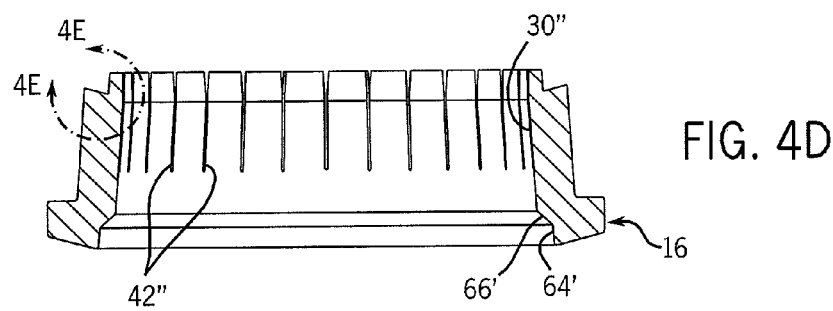
FIG. 4D is a cross-sectional view of the third stage.
Figure 4E:
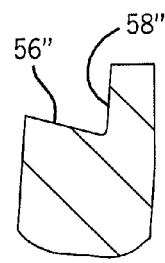
FIG. 4E is an enlarged cross-sectional view of a downstream portion of the third stage.
Figure 4F:
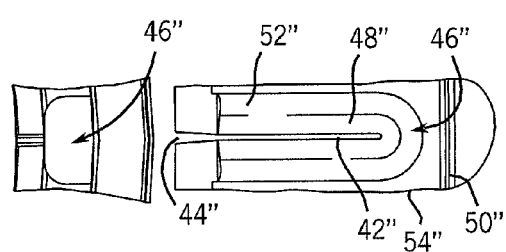
FIG. 4F is a plan view of a slot that forms part of the third stage.
Figure 5A:
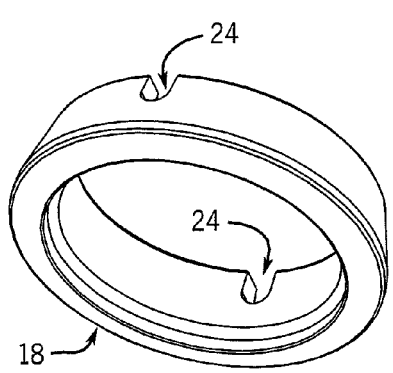
FIG. 5A is a perspective view of a nose section of the separation chamber.
Figure 5B:
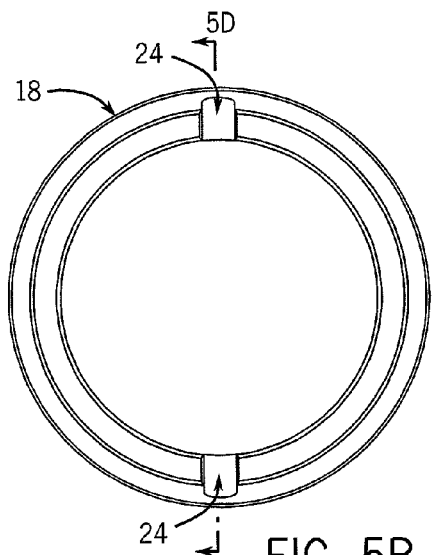
FIG. 5B is a discharge end view of the nose section.
Figure 5C:
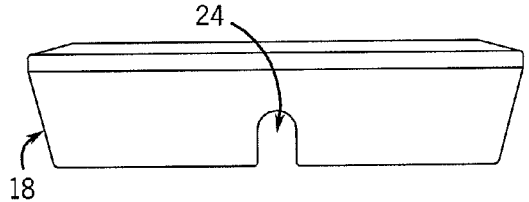
FIG. 5C is a side elevation view of the nose section.
Figure 5D:
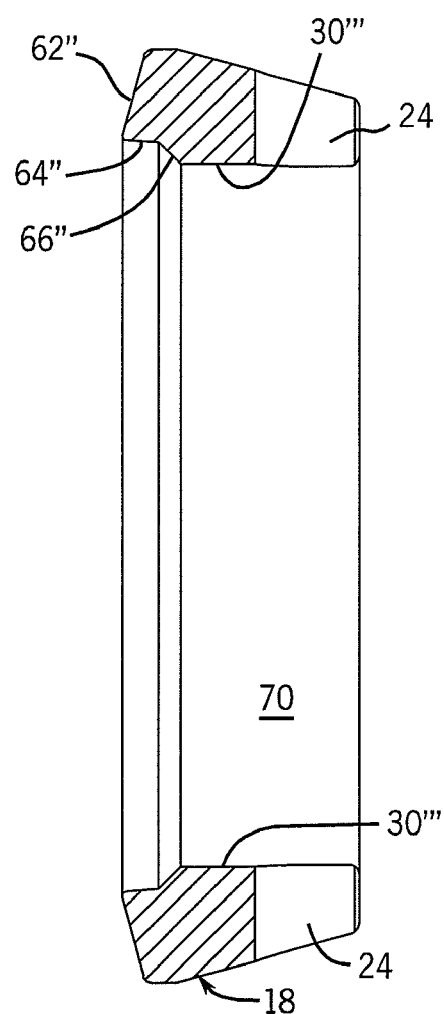
FIG. 5D is a cross-sectional view of the nose section.

As shown in FIG. 3F each groove 46' is formed such that its end wall 50' has a rounded configuration. Further, an arcuate transition area is located between the bottom wall 48' and the associated groove side walls 52'.

Referring now to FIGS. 4A-4F, the downstream end of downstream section 16 also has the same construction as the downstream portions of upstream section 12 and intermediate section 14, although again having a reduced overall diameter due to the tapered construction of sections 12-14. For convenient reference, double primed reference characters will be used to refer to the analogous structure of downstream section 16.

Downstream section 16 has radially spaced slots 42" that are formed along the inner wall 30" thereof. The slots 42" are generally parallel to one another and equally radially spaced about the inner wall 30". Each slot 42" includes a divergent inlet or entrance portion 44" that opens onto end edge 38. At the location of each slot 42", downstream section 16 includes an axial groove 46" which extends partially through the material of side wall 30". Each groove 46" is formed to define a bottom wall 48", an end wall 50" and a pair of parallel side walls 52". Each groove 46" is open at its downstream end, and a rib 54" is located between each adjacent pair of grooves 46". Ribs 54" are formed of the material of side wall 30" which remains after grooves 46" are formed inside wall 30". The majority of the length of each slot 42" opens onto groove bottom wall 48", to establish communication between passage 36 and the exterior of downstream section 16. Each rib 54" terminates in an inwardly angled downstream edge 56", which terminates at its inner end at the outer surface of a downstream extension tab 58". The facing edges of each adjacent pair of downstream extension tabs 58" function to form divergent entrance portion 44" of the slot 42" located therebetween. Downstream extension tabs 58" are configured to form a reduced diameter segmented engagement ring at the downstream end of downstream section 16.

An exemplary nose section 18 that connects with downstream section 16 is shown in FIGS. 5A-5D; however, it is contemplated that nose section 18 can be similarly connected to intermediate section 14 or upstream section 12. Nose section 18 includes a pair of diametrically aligned slots 24, each of which is adapted to receive an anti-rotation bar or key 26. Similar to sections 12, 14, and 16, nose section 18 has a tapered inner wall 30'" that generally aligns with tapered wall 30" of downstream section 16. Nose section 18 has an upstream wall 62" that engages downstream edges 56" of ribs 54" of downstream section 16. Further, nose section 18 defines a passage 70 located downstream of inlet wall 66" of the downstream section 16, which leads to a discharge outlet opening defined by the downstream end of nose section 18.

Figure 6A:
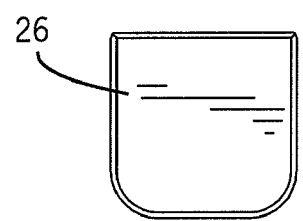
FIG. 6A is an elevation view of an anti-rotation key according to one embodiment of the present disclosure.
Figure 6B:
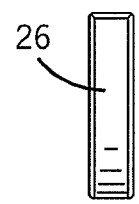
FIG. 6B is a side view of the anti-rotation key.

An exemplary anti-rotation key 26 is shown in FIGS. 6A and 6B. As shown thereat, key 26 has a shape generally similar to that defined by the slots 24 of nose section 18. In this regard, the keys 26, which are preferably attached to the interior surface of the housing (not shown) for the separation chamber 10, can be easily received within the slots 24 to prevent rotation of the nose section 18 relative to the housing of the separation chamber. Since the upstream section 12, intermediate section 14, and downstream section 16 are securely connected one another, as described below, by preventing rotation of nose section 18, rotation of the other chamber sections 12-16 is also prevented.

Engagement of the chamber sections will now be described. The upstream ends of intermediate section 14, downstream section 16 and nose section 18 include engagement structure for interconnection with the downstream ends of upstream section 12, intermediate section 14 and downstream section 16, respectively. As shown with respect to intermediate section 14 in FIGS. 3A-3F, the upstream engagement structure includes an angled upstream wall 62 which has an angle that matches the angle of downstream edges 56 of ribs 54, and an axial inner wall 64 that extends in a downstream direction from the lower end of upstream wall 62, and having an angle that matches that of tabs 58. An inwardly angled inlet wall 66 extends inwardly and downstream from the inner end of axial inner wall 64 and merges with the inner surface of side wall 30' of intermediate section 14.

In assembly, upstream section 12, intermediate section 14, downstream section 16 and nose section 18 are secured together to form separation chamber 10. The upstream end of intermediate section 14 is engaged with the downstream end of upstream section 12, by engaging downstream extension tabs 58 of upstream section 12 within the annular area defined by axial inner wall 64 of intermediate section 14. Upstream wall 62 of intermediate section 12 abuts the angled downstream edges 56 of ribs 54 to fix the axial position of intermediate section 14 relative to upstream section 12. When intermediate section 14 and downstream section 12 are assembled in this manner, angled inlet wall 66 of intermediate section 14 defines an open area located downstream of and in communication with divergent entrance portions 44 of slots 42. Upstream of the area at which intermediate section 14 and upstream section 12 are engaged together, each slot 42 opens outwardly into its associated groove 46.

In a similar manner, intermediate section 14 is engaged with downstream section 16 via receipt of downstream extension tabs 58' within the space defined by axial inner wall 64' of downstream section 16, and upstream wall 62' engages downstream edges 56' of ribs 54' to fix the axial position of downstream section 16 relative to intermediate section 14. Inwardly angled inlet wall 66' defines an open area located downstream of and in communication with each slot entrance portion 44'. Each slot 42' opens outwardly into its associated groove 46'. Downstream extension tabs 58" of downstream section 16 engage axial inner wall 64" of nose section 18, which includes upstream wall 62" that engages downstream edges 56" of ribs 54". Inwardly angled inlet wall 66" defines an open area located downstream of and in communication with slot entrance portions 44". Each slot 42" opens outwardly into its associated groove 46".

In operation, a material containing both hard and soft components, such as a meat material including usable soft muscle material as well as unusable hard material such as bone, sinew or the like, is advanced downstream through separation chamber 10, typically by use of a tapered auger which extends through passages 28, 32, 36 and 70. The material is subjected to pressure within the interior of separation chamber 10, and slots 42, 42' and 42" provide pressure relief areas through which the soft material passes for collection into an external collection chamber or receptacle. Angled inlet walls 66, 66' and 66" provide a low pressure flow path for supplying material to slot entrance portions 44, 44' and 44", respectively, to supply the soft material to slots 42, 42' and 42", respectively. In this manner, the soft material passes through slots 42, 42' and 42" outwardly into grooves 46, 46' and 46" and to the exterior of separation chamber 10, while the hard material remaining within the interior of separation chamber 10 is advanced in a downstream direction through passages 28, 32, 36 and 70.

With the construction as described, the length of the separation chamber can be varied by adding or removing sections of the chamber, according to the desired flow rate, material characteristics or other parameters. While the slots are illustrated as being open in a forward or downstream direction, it is also considered that slots having generally the same configuration as in the prior art may be employed in a segmented construction as shown and described. Further, while the slots are shown and described as being axial, it is also understood that the slots may have an angled orientation, either with or against the direction of rotation of the auger, and may be slanted either at a forward or reverse angle relative to the direction of rotation of the auger. In addition, it is possible to form the separation chamber as a one-piece member having a solid outer wall, in which internal peripheral grooves are formed that correspond to the open areas defined by the angled walls such as inlet walls 66, with slots formed in the outer wall extending from the grooves that correspond to slots 42.

The present invention has been described in terms of the preferred embodiment, and it is recognized that equivalents, alternatives, and modifications, aside from those expressly stated, are possible and within the scope of the appending claims.

What is claimed is:

1. A separation chamber for separating soft material from a hard material carrier to which the soft material is attached, the separation chamber having an interior volume sized for receiving and passing a mass, and comprising:
   a first chamber member defining a first feed end and a first discharge end, wherein a first portion of the interior volume is defined by a first sidewall located between the first feed end and the first discharge end;
   a second chamber member removably connected to the first chamber member, and defining a second feed end and a second discharge end, wherein a second portion of the interior volume is defined by a second sidewall located between the second feed end and the second discharge end; and
   wherein the first sidewall and the second sidewall generally align with each other when the first and second chambers are connected together.

2. The separation chamber of claim 1 wherein the first chamber has a frustoconical shape defined by the first sidewall, and wherein the first sidewall is an annular tapered wall.

3. The separation chamber of claim 2 wherein the first feed end has a first diameter and the first discharge end has a second diameter that is less in magnitude than the first diameter.

4. The separation chamber of claim 3 wherein the second feed end has a third diameter and the second discharge end has a fourth diameter that is less in magnitude than the third diameter.

5. The separation chamber of claim 4 wherein the third diameter is less in magnitude than the second diameter.

6. The separation chamber of claim 1 wherein the first feed end has a first diameter and the first discharge end has a second diameter that is equal in magnitude to the first diameter.

7. The separation chamber of claim 1 further comprising a plurality of perforations in the first sidewall, wherein the perforations define a first plurality of passages for the passage of material from the first portion of the interior volume to the exterior of the first chamber member.

8. A separation chamber for separating soft material from a hard material carrier to which the soft material is attached, the separation chamber having an interior volume sized for receiving and passing a mass, and comprising:
   a first chamber member defining a first feed end and a first discharge end, wherein a first portion of the interior volume is defined between the first feed end and the first discharge end, wherein the first chamber member has a generally annular wall extending between the first feed end and the first discharge end, and wherein the annular wall has a plurality of perforations defining a first plurality of passages for the passage of material from the first portion of the interior volume; and
   a second chamber member removably connected to the first chamber member, and defining a second feed end and a second discharge end, wherein a second portion of the interior volume is defined between the second feed end and the second discharge end, wherein the second chamber member has a generally annular wall extending between the second feed end and the second discharge end, and wherein the annular wall has a plurality of perforations defining a second plurality of passages for the passage of material from the second portion of the interior volume.

9. The separation chamber of claim 8 wherein the first chamber member and the second chamber member are removably connected to each other.

10. The separation chamber of claim 9 wherein the first plurality of perforations and the second plurality of perforations are generally aligned with each other.

11. The separation chamber of claim 8 wherein the perforations of the first plurality of perforations are not aligned with the perforations of the second plurality of perforations.

12. The separation chamber of claim 8 wherein a first portion of the first plurality of perforations are open-ended and a second portion of the second plurality of perforations are open-ended.

13. The separation chamber of claim 8 further comprising a nose member removably connected to the second chamber member and interfacing with structure that prevents rotation of the nose member relative to the first chamber member and the second chamber member.

14. A separation chamber for separating soft material from a hard material carrier to which the soft material is attached, the separation chamber having an interior volume sized for receiving and passing a mass, and comprising:
   a first chamber member defining a first feed end and a first discharge end, wherein a first portion of the interior volume is defined between the first feed end and the first discharge end, wherein the first chamber has a frustoconical shape defined by an annular tapered wall extending between the first feed end and the first discharge end;
   a second chamber member removably connected to the first chamber member, and defining a second feed end and a second discharge end, wherein a second portion of the interior volume is defined between the second feed end and the second discharge end; and
   a third chamber member removably connected to the second chamber member, and defining a third feed end and a third discharge end, wherein a third portion of the interior volume is defined between the third feed end and the third discharge end.

15. The separation chamber of claim 14 wherein:
   the first feed end has a first diameter and the first discharge end has a second diameter that is less in magnitude than the first diameter;
   the second feed end has a third diameter and the second discharge end has a fourth diameter that is less in magnitude that the third diameter; and
   the third feed end has a fifth diameter and the third discharge end has a sixth diameter that is less in magnitude than the fifth diameter.

16. The separation chamber of claim 15 wherein the fifth diameter is less than the fourth diameter.

17. A separation chamber for separating soft material from a hard material carrier to which the soft material is attached, the separation chamber having an interior volume sized for receiving and passing a mass, and comprising:
   a first chamber member defining a first feed end and a first discharge end, wherein a first portion of the interior volume is defined between the first feed end and the first discharge end;

a second chamber member removably connected to the first chamber member, and defining a second feed end and a second discharge end, wherein a second portion of the interior volume is defined between the second feed end and the second discharge end; and a third chamber member removably connected to the second chamber member, and defining a third feed end and a third discharge end, wherein a third portion of the interior volume is defined between the third feed end and the third discharge end.

18. A separation chamber for a meat processing machine, comprising:

an upstream chamber section having an annular side wall defining a first internal passage, wherein the annular side wall includes a first plurality of perforations;

a downstream chamber section having an annular side wall defining a second internal passage, wherein the annular side wall of the downstream chamber section includes a second plurality of perforations, and wherein the downstream chamber section is removably connected to the upstream chamber section; and wherein the first plurality of perforations and the second plurality of perforations establish communication between the first and second internal passages defined by the upstream and downstream chamber sections, respectively, and an exterior of the separation chamber formed by the connected upstream and downstream chamber sections.

19. The separation chamber of claim 18 wherein each chamber section defines a downstream end, and wherein at least some of the perforations are in the form of slots having an inlet that opens onto the downstream end.

* * * * *